United States Patent
Ganesan

(10) Patent No.: US 10,111,181 B2
(45) Date of Patent: Oct. 23, 2018

(54) SYSTEM AND METHOD FOR ENHANCING CHANNEL ESTIMATION AT A RECEIVER

(71) Applicant: SIGNALCHIP INNOVATIONS PRIVATE LIMITED, Bangalore (IN)

(72) Inventor: Aravind Ganesan, Bangalore (IN)

( * ) Notice: Subject to any disclaimer, the term of this patent is extended or adjusted under 35 U.S.C. 154(b) by 111 days.

(21) Appl. No.: 15/258,764

(22) Filed: Sep. 7, 2016

(65) Prior Publication Data
US 2017/0070997 A1    Mar. 9, 2017

(30) Foreign Application Priority Data

Sep. 7, 2015    (IN) ............................ 4734/CHE/2015

(51) Int. Cl.
| | |
|---|---|
| H04W 52/22 | (2009.01) |
| H04W 52/00 | (2009.01) |
| H04W 24/02 | (2009.01) |
| H04L 5/12 | (2006.01) |
| H04L 5/04 | (2006.01) |

(Continued)

(52) U.S. Cl.
CPC .......... *H04W 52/22* (2013.01); *H04B 1/7093* (2013.01); *H04B 17/21* (2015.01); *H04B 17/26* (2015.01); *H04L 5/0021* (2013.01); *H04L 5/04* (2013.01); *H04L 5/12* (2013.01); *H04L 27/2334* (2013.01); *H04L 27/389* (2013.01); *H04L 27/3872* (2013.01); *H04W 24/02* (2013.01); *H04W 52/00* (2013.01); *H04W 52/221* (2013.01); *H04W 52/225* (2013.01); *H04B 2001/70935* (2013.01)

(58) Field of Classification Search
CPC .. H04B 1/10–1/14; H04B 1/707–1/712; H04B 10/6164–10/6165; H04B 17/11–17/14; H04B 17/20–17/3913; H04L 5/0021; H04L 5/02–5/12; H04L 25/0202–25/0258; H04L 25/03178–25/03337; H04L 2025/03433–2025/03585; H04L 27/14–27/1566; H04L 27/22–27/2338; H04L 27/38–27/389; H04W 24/02–24/10; H04W 52/02–52/60; H04W 56/0005–56/0095; H04W 88/02
See application file for complete search history.

(56) References Cited

U.S. PATENT DOCUMENTS

| | | | |
|---|---|---|---|
| 6,944,245 B2 * | 9/2005 | Stewart | H04L 25/03038 375/346 |
| 7,486,747 B1 * | 2/2009 | Bagley | H04B 1/7093 375/324 |

* cited by examiner

*Primary Examiner* — Timothy J Weidner
(74) *Attorney, Agent, or Firm* — The Law Office of Austin Bonderer, PC; Austin Bonderer

(57) ABSTRACT

Disclosed is a receiver for enhancing estimation of a channel of a received signal. The receiver is being configured to (i) process at least one of (a) power control commands to obtain a pattern of processed power control commands or (b) phase estimation to obtain a pattern of processed phase estimation; (ii) match the pattern of at least one of (a) processed power control commands, or (b) processed phase estimation to a pattern corresponding to one or more channels; (iii) determine a type of channel of the one or more channels based on the matched pattern of at least one of (a) said processed power control commands, or (b) said processed phase estimation, (iv) determine filtering parameters based on a type of channel that is determined and (v) enhance estimation of the channel based on the filtering parameters associated with the type of channel that is determined.

12 Claims, 8 Drawing Sheets

(51) Int. Cl.
*H04L 5/00* (2006.01)
*H04L 27/38* (2006.01)
*H04L 27/233* (2006.01)
*H04B 17/26* (2015.01)
*H04B 17/21* (2015.01)
*H04B 1/7093* (2011.01)

SYSTEM AND METHOD FOR ENHANCING CHANNEL ESTIMATION AT A RECEIVER

CROSS-REFERENCE TO RELATED APPLICATIONS

This application claims priority to Indian patent application no. 4734/CHE/2015 filed on Sep. 7, 2015, the complete disclosure of which, in its entirety, is herein incorporated by reference.

BACKGROUND

Technical Field

The embodiments herein generally relate to channel estimation, and, more particularly, to a system and a method for enhancing estimation of a channel at a receiver based on channel type detection.

Description of the Related Art

From the traditional analog systems, such as those defined by the standards AMPS (Advanced Mobile Phone System) and NMT (Nordic Mobile Telephone), the cellular telephone industry has had an enormous development in the world in the past decades. In the past years, the development has been almost exclusively focused on standards for digital solutions for cellular radio network systems, such as D-AMPS (e.g., as specified in EIA/TIA-IS-54-B and IS-136) and GSM (Global System for Mobile Communications), generally referred to as the second generation of mobile communications systems. Currently, the cellular technology is entering the fifth generation, also denoted as 5G. Along with the early versions of 5G technology, the previous technologies denoted as 2G, 3G and 4G are active. While WCDMA (Wideband Code Division Multiple Access) is by far the most widely adopted 3G air-interface technologies in the new IMT-2000 frequency bands, LTE is the adopted standard for 4G air-interface and standardized by 3GPP (Third Generation Partnership Project) and ITU (international Telecommunication Union), WCDMA and LTE have gained broad acceptance within the wireless communication industry. In WCDMA, user data is spread over a bandwidth of circa 5 MHz. The wide bandwidth supports high user data rates and also provides performance benefits due to frequency diversity. However, the exact data transmission speed that is available for the system users is not easily predictable. The actual capacity in the mobile networks is affected by a number of factors, such as propagation conditions, how many users currently communicate through a common base station, and, most importantly, the distance between the user mobile terminal and the base station antenna. The LTE allow more bandwidth configurations and is based on OFDM and SCFDM in the downlink & uplink respectively. In the terminology for WCDMA, a radio base station is referred to as a Node B. A radio base station includes a radio receiver devised to receive radio signals from an antenna coupled to or integrated with the base station. The radio receiver may receive the signal from the transmitter along with noise. The noise not only affects the data portion, but also the pilot portion, used for channel estimation. Hence, estimation of the channel may not be optimum and the output channel estimation is affected due to the effects of noise. Improving the estimation of the channel under varying channel conditions is a challenge posed to the signal that is received. Accordingly, there remains a need for enhancing estimation of a channel at a receiver side based on channel type detection.

SUMMARY

In view of a foregoing, an embodiment herein provides a receiver for enhancing estimation of a channel of a received signal. The receiver is being configured to (i) process at least one of (a) power control commands to obtain a pattern of processed power control commands, or (b) phase estimation to obtain a pattern of processed phase estimation; (ii) match the pattern of at least one of (a) processed power control commands, or (b) processed phase estimation to a pattern corresponding to one or more channels; (iii) determine a type of channel of the one or more channels based on the matched pattern of at least one of (a) the processed power control commands, or (b) the processed phase estimation, (iv) determine filtering parameters based on the type of channel that is determined and (v) enhance estimation of the channel based on the filtering parameters associated with the type of channel that is determined. The power control commands include at least one of (a) power up, or (b) power down.

In an embodiment, the receiver configures the estimation of the channel by at least one of (a) changing the averaging period for the estimation of the channel for the type of channel, (b) changing the number of taps estimated in a channel in case of estimation of a time domain channel, (c) changing the tap spacing in case of the estimation of the time domain channel or (d) changing the number of frequency tones averaged in the channel in case of estimation of a frequency domain channel.

In another embodiment, when the receiver is a WCDMA receiver, the process of the power control commands includes the steps of: (a) setting an index change to zero value; (b) assuming the power control commands sequentially; (c) analyzing the power control command sequence to determine a channel gain variation; (d) calculating a metric value in the window as (number of power up commands−number of power down commands); (e) labelling the window as 1 (power down) when the metric is less than a threshold; (f) determining a period for power change from a sequence of labels and (g) determining the type of channel using the period for power change to enhance the estimation of the channel of the received signal. The power control commands are at least one of (a) power increase, or (b) power decrease. "N" power control commands ($PC_{(k-1)N+1}$ to $PC_{kN}$) are obtained in the window "k". The "N", and the "k" are positive integers indicating the window length and a window index respectively. The window is labeled as 2 (power up) when the metric value is greater than another threshold. The window is labeled as 0 (power unchanged) when neither the metric value that is less than said threshold nor the metric value that is greater than said another threshold is met.

In yet another embodiment, when the receiver includes a WCDMA receiver, the matching includes at least one of (a) computing an average rate of change of the phase estimation after the phase is unwrapped or (b) finding the rate of change of the phase estimation with a maximum likelihood (ML) value after the phase is unwrapped.

In yet another embodiment, the one or more channels are classified based on a magnitude of the power control commands used by a classifier.

In one aspect, a method of enhancing estimation of a channel of a received signal at a receiver. The method includes the steps of: (i) processing at least one of (a) power control commands to obtain a pattern of processed power control commands or (b) phase estimation to obtain a pattern of processed phase estimation; (ii) matching the pattern of at least one of (a) processed power control commands, or (b) processed phase estimation to a pattern corresponding to one or more channels; (iii) determining a type of channel of the one or more channels based on the matched pattern of at least one of (a) the processed power control commands or (b) the processed phase estimation; (iv) determining filtering parameters based on the type of channel that is determined and (v) enhancing estimation of the channel based on the filtering parameters associated with the type of channel that is determined. The power control commands include at least one of (a) power up, or (b) power down.

In an embodiment, the method further includes the step of configuring the estimation of the channel by at least one of (a) changing the averaging period for the estimation of the channel for the type of channel; (b) changing the number of taps estimated in a channel in case of estimation of a time domain channel; (c) changing the tap spacing in case of the estimation of the time domain channel or (d) changing the number of frequency tones averaged in the channel in case of estimation of a frequency domain channel.

In another embodiment, when the receiver includes a WCDMA receiver, the processing of the power control commands include the steps of: (a) setting an index change to zero value; (b) assuming the power control commands sequentially; (c) analyzing the power control command sequence to determine a channel gain variation; (d) calculating a metric value in the window as (number of power up commands−number of power down commands); (e) labeling the window as 1 (power down) when the metric is less than a threshold; (f) determining a period for power change from a sequence of labels and (g) determining the type of channel using the period for power change to enhance the estimation of the channel of the received signal. The power control commands are assumed at least one of (a) power increase, or (b) power decrease. "N" power control commands ($PC_{(k-1)N+1}$ to $PC_{kN}$) are obtained in the window "k". The "N", and the "k" are positive integers indicating the window length and a window index respectively. The window is labeled as 2 (power up) when the metric value is greater than another threshold. The window is labeled as 0 (power unchanged) when neither the metric value that is less than said threshold nor the metric value that is greater than said another threshold is met.

In yet another embodiment, the processing of the power control commands includes a weighted average of a power control command value. A weight for the weighted average includes at least one of (a) a rectangular shape, (b) a triangular shape, (c) Gaussian function, or (d) polynomial function.

In yet another embodiment, the period for power change is measured as an average number of contiguous windows when the power is at least one of (a) down or unchanged or (b) up or unchanged.

In yet another embodiment, the one or more channels are classified based on sequence of magnitudes of the power control commands used by a classifier.

In yet another embodiment, the matching includes the step of at least one of (a) computing an average rate of change of the phase estimation after the phase is unwrapped or (b) finding the rate of change of the phase estimation with a maximum likelihood (ML) value after the phase is unwrapped.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
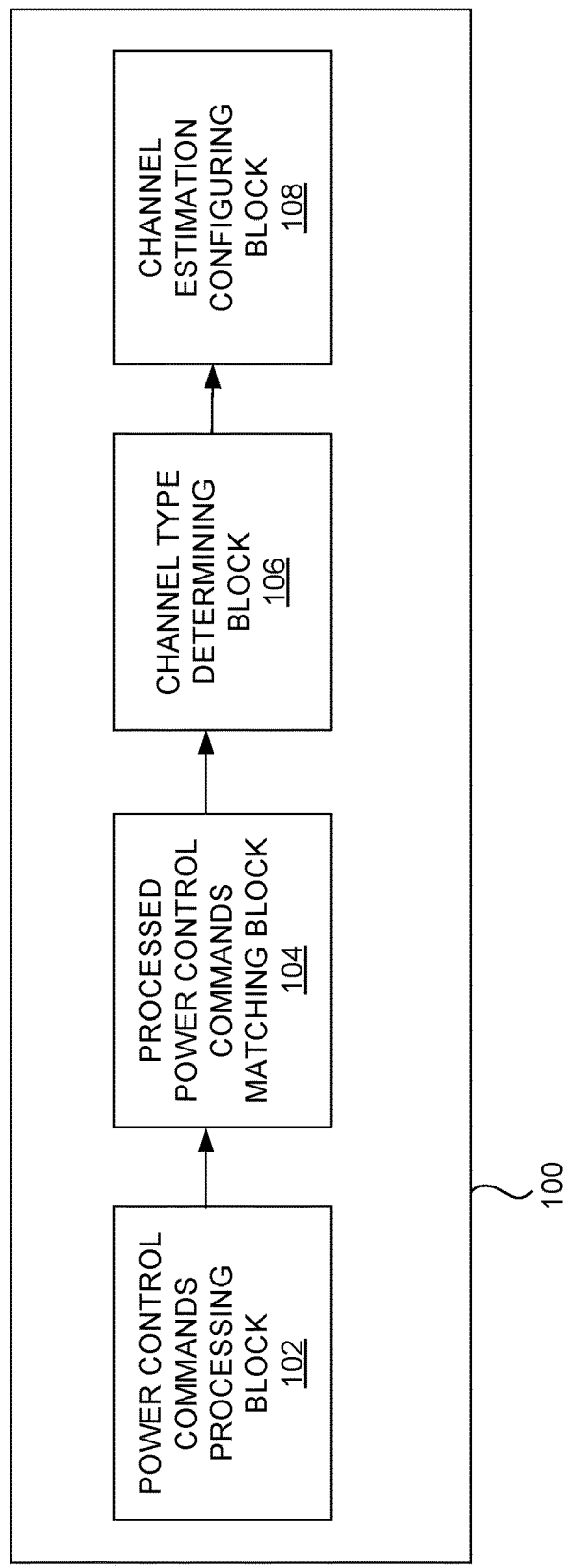
FIG. 1A depicts a systematic process flow for enhancing estimation of a channel of a received signal at a receiver based on a type of channel using power control commands according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to enhance estimation of a channel of a received signal that suffers from noise at a receiver based on channel type detection. The estimation of the channel is performed for coherent demodulation of the received signal. A pilot based/blind channel estimation of the received signal suffers from effects of noise at the receiver. By averaging the estimation of the channel, the effect of noise on the estimation of the channel is reduced. The estimation of the channel changes as a function of time, therefore the estimation of the channel needs to be tracked. By averaging the estimation of the channel, the speed at which the channel changing is reduced. Referring now to the drawings and more particularly to FIGS. 1A through 6, where similar reference characters denote corresponding features consistently throughout the figures, there are shown preferred embodiments.

FIG. 1A depicts a systematic process flow for enhancing estimation of a channel of a received signal at a receiver 100 based on a type of channel using power control commands according to an embodiment herein. In an embodiment, the receiver 100 is a wide band code division multiple access (WCDMA) receiver. The receiver 100 may be configured to enhance the estimation of the channel of the received signal. In an embodiment, the receiver 100 may include a power control commands processing block 102, a processed power control commands matching block 104, a channel type determining block 106, and a channel type configuration block 108. The power control commands processing block 102 processes the power control commands to obtain a pattern of processed power control commands. In an embodiment, the power control commands include at least one of (a) power up, or (b) power down. In an embodiment, a period for power change is measured as an average number of contiguous windows when the power is at least one of (a) down or unchanged (e.g. the window length (9, 11) for sequences 20020002011001010010), or (b) up or unchanged (e.g. the window length (15, 5, 5) for the sequences 20000000200200101002020). The power control commands processing block 102 may provide an indication of a rate at which the received signal of the desired channel is changing. In an embodiment, the rate of change in channel of the received signal is estimated by monitoring the power control command. The rate of change in the channel may be correlated to the type of channel of one or more channels. The power control command processing block 102 includes a weighted average of a power control command value. In an embodiment, the weight for the weightedaverage includes at least one of (a) a rectangular shape, (b) a triangular shape, (c) Gaussian function or (d) polynomial function In the WCDMA uplink, due to an adverse effect of unregulated uplink power of the different users at the receiver 100, the system includes power control loops to ensure that receiver power at the receiver 100 is kept as equal as possible and/or in proportion to a predetermined ratio depending on performance requirement for different users. A base station estimates the uplink power of all the users, and controls the usage of power by sending the power control commands to either increase or decrease the transmitted power. In one embodiment, the nature of the channel is estimated indirectly by monitoring the power control commands. In one embodiment, if the cumulative power is increased and/or decreased over a large period, then the one or more channels are treated as slow varying channels. In another embodiment, if the cumulative power is increased and/or decreased over a shorter period, then the one or more channels are treated as fast varying channels. Since the power control command is available in the fast power control loop that is increased and/or decreased, an alternating sequence of power up and/or power down is interpreted as a no power change command. The estimation of the channel using the power control commands may be done by at least one of a base station or mobile equipment (UE) as the at least one of the base station or the mobile equipment includes an access to the relevant power control commands. Thus, the net power up and/or power down is estimated over a window of power control commands.

The processed power control commands matching block 104 matches the pattern of the processed power control commands to a pattern corresponding to one or more channels to obtain a processed power control commands matching output. The channel type determining block 106 (i.e. a channel type estimator) receives the processed power control matching output and matches with a history of processed power control commands matching output to determine the type of channel of the one or more channels based on the matched pattern of the processed power control commands and templates of type of one or more channels. In an embodiment, the determination of the type of channel is implemented as a weighted filtering of processed output. The channel estimation configuration block 108 configures the estimation of the channel by at least one of (a) changing the averaging period for the estimation of the channel for the type of channel, (b) changing the number of taps estimated in the channel in case of estimation of a time domain channel, (c) changing the tap spacing in case of the estimation of the time domain channel or (d) changing the number of frequency tones averaged in the channel in case of estimation of a frequency domain channel. In an embodiment, the one or more channels are classified based on a magnitude of the power control commands that are used by a classifier. Based on the type of channel, filtering of the estimation of the channel of the received signal is controlled to provide optimum performance of the estimation of the channel using the channel estimation configuration block 108.

The filtering of the estimation of the channel is tuned to the speed at which the channel is changing. The filtering of the noise in the received signal enhances the estimation of the channel of the received signal. The estimation of the channel with the effects of noise is distinctly different from the enhanced estimation of the channel (i.e. after filtering noise from the received signal based on the type of channel). The estimation of the channel of received signal that suffers from effects of noise is varying rapidly when compared to the estimation of the channel of the filtered signal. Based on the power control command, the channel estimation parameters (i.e. the filtering parameters such as (a) a block length of a filter in FIR filtering, (b) a forgetting factor of a filter in IIR filtering, and (c) speed of a system in Kalman filter) that control the averaging of the raw channel estimate may be tuned. In one embodiment, the filtering parameters are tuned based on spacing between the filtering parameters. In another embodiment, the filtering parameters may be predetermined or determined at a time of determining the type of channel. In another embodiment, the estimation of the channel is enhanced based on the filtering parameters associated with the type of channel that is determined.

Figure 1B:
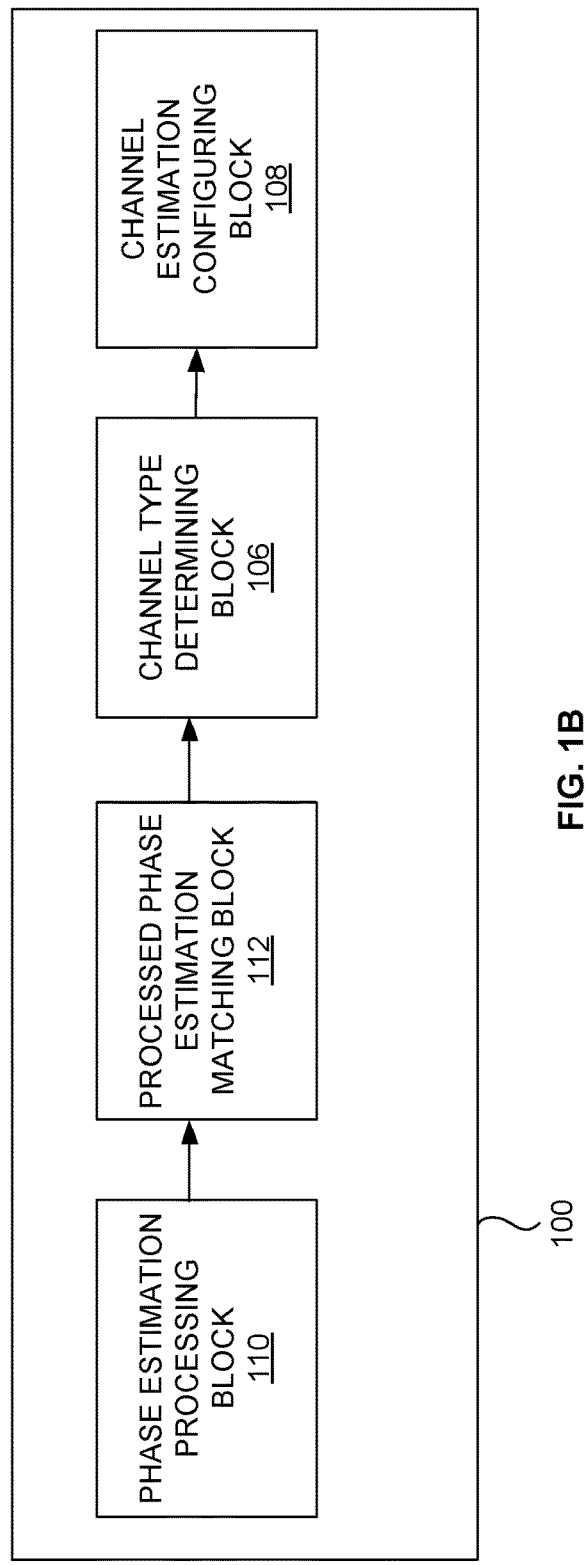
FIG. 1B depicts a systematic process flow enhancing estimation of channel of a received signal at the receiver based on the type of channel using phase estimation according to an embodiment herein.

FIG. 1B depicts a systematic process flow enhancing estimation of channel of a received signal at the receiver 100 based on the type of channel using phase estimation according to an embodiment herein. In one embodiment, the receiver 100 may include a phase estimation processing block 110, a processed phase estimation matching block 112. The phase estimation processing block 110 processes phase estimation to obtain a pattern of processed phase estimation. At the phase estimation processing block 110, the phase estimation of a channel correlation input is monitored. At the phase estimation processing block 110, the phase of a main tap of the raw channel correlation input (i.e. the received signal) is estimated. In one embodiment, a short length averaging of the channel correlation input is performed before the phase estimation. In another embodiment, when the filtering is disabled, the raw channel correlation input is used at the phase estimation processing block 110.

The processed phase estimation matching block 112 matches the pattern of the processed phase estimation to a pattern corresponding to the one or more channels to obtain a processed phase estimation matching output. The channel type determining block 106 (i.e. a channel type estimator) receives the processed phase estimation matching output and matches with a history of processed phase estimation matching output to determine the type of channel based on the matched pattern of the processed phase estimation and templates of the type of one or more channels. In an embodiment, the channel type determining block 106 determines the type of the one or more channels based on the rate of increase of the phase estimation of channel correlation input. The rate of change of phase (e.g. a slope that shows the rate of change of the phase) is related to the rate of change of the type of channel of the one or more channels. Based on the type of channel of the one or more channels, the filtering of the estimation of the channel of the received signal (i.e. the channel correlation input) is controlled to provide optimum performance of the estimation of the channel.

The channel estimation configuring block 108 configures the estimation of the channel by at least one of (a) changing the averaging period for the estimation of the channel for the type of channel, (b) changing the number of taps estimated in the channel in case of the estimation of a time domain channel, (c) changing the tap spacing in case of the estimation of the time domain channel or (d) changing the number of frequency tones averaged in the channel in case of the estimation of a frequency domain channel. In an embodiment, the estimation of the channel tracks a location of channel impulse response. The tap that corresponds to largest energy in the channel impulse response is referred to as the main tap. In an embodiment, at the channel estimation configuring block 108, the rate of change of the channel is estimated by processing the channel correlation input (i.e. a received signal) to a noise averaging module.

For example, in a WCDMA receiver, the estimation of the channel is performed on a pilot channel using the channel correlation input with spreading code corresponding to dedicated physical control channel (DPCCH). The DPCCH is the pilot channel in the WCDMA receiver. The DPCCH may perform the estimation of the channel. The channel is spread with spreading codes to estimate the channel. In one embodiment, the dispreading is done with sequence of power control commands. In an embodiment, short time variance of the received signal is calculated for each time period of the estimation of the channel. In one embodiment, if the variance of the received signal calculated using the phase estimation is high for each time period of the estimation of the channel when compared to the variance the received signal, the power control command for each time period of the estimation of the channel is calculated. In an embodiment, the rate of increase of the phase estimation and the rate of change in channel estimated by monitoring the power control command are combined through optimum weighting to determine the type of channel.

Figure 1C:
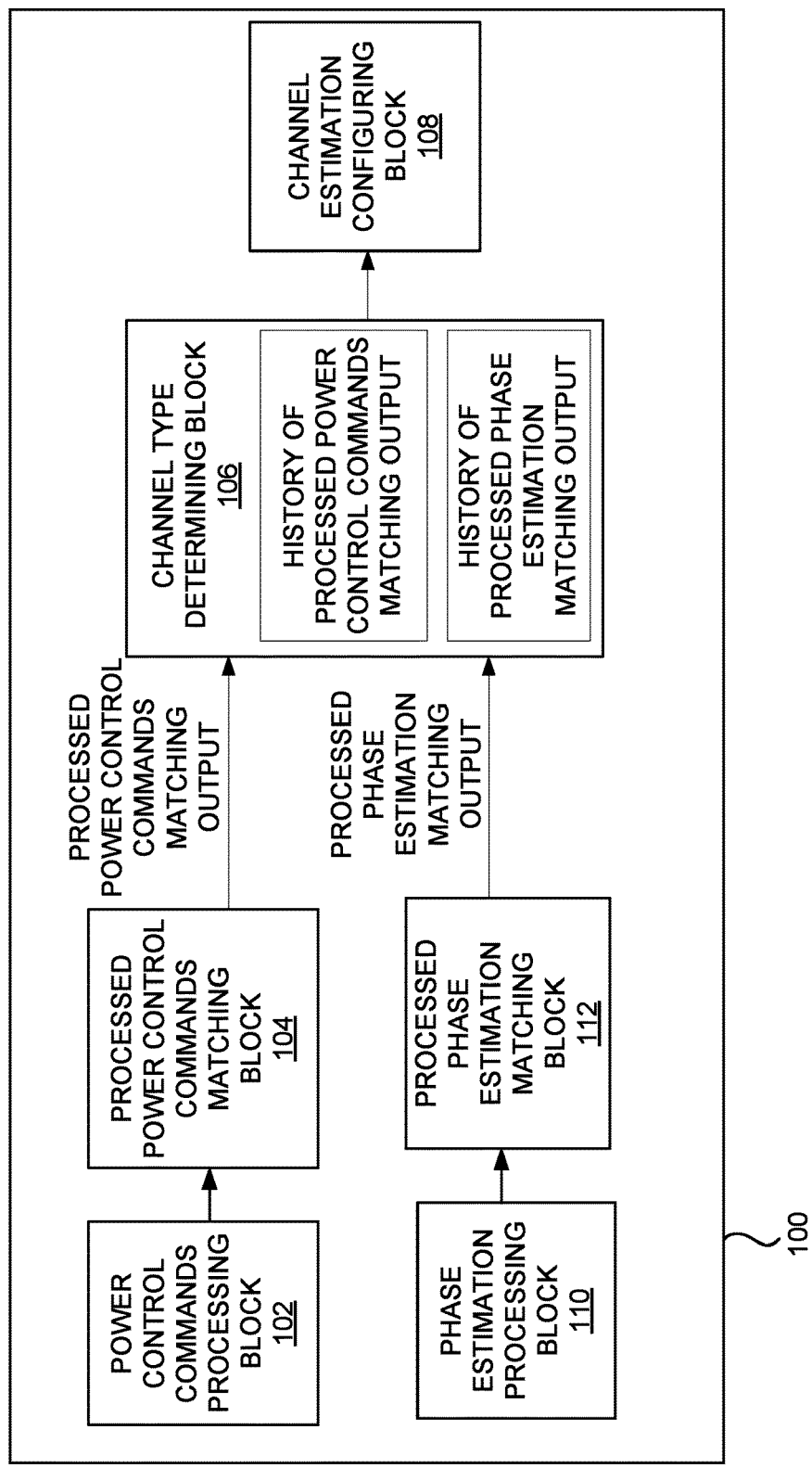
FIG. 1C depicts a systematic process flow for enhancing estimation of a channel of a received signal at a receiver based on a type of channel using both power control commands and phase estimation according to an embodiment herein.

FIG. 1C depicts a systematic process flow for enhancing estimation of a channel of a received signal at a receiver 100 based on a type of channel using both power control commands and phase estimation according to an embodiment herein. The power control commands processing block 102 processes the power control commands to obtain a pattern of processed power control commands. The processed power control commands matching block 104 matches the pattern of the processed power control commands to a pattern corresponding to one or more channels to obtain a processed power control commands matching output. Similarly, the phase estimation processing block 110 processes phase estimation to obtain a pattern of processed phase estimation. The processed phase estimation matching block 112 matches the pattern of the processed phase estimation to a pattern corresponding to the one or more channels to obtain a processed phase estimation matching output. The channel type determining block 106 receives the processed power control commands matching output and the processed phase estimation matching output and matches with a history of processed power control commands matching output and a history of processed phase estimation matching output respectively to determine a type of channel. In one embodiment, the determination of the type of channel is implemented as a weighted filtering of the processed power control commands matching output and the processed phase estimation matching output. The channel estimation configuring block 108 determines filtering parameters based on the type of channel that is determined. Further, the channel estimation configuring block 108 enhances estimation of the channel based on the filtering parameters associated with the type of channel that is determined.

Figure 2:
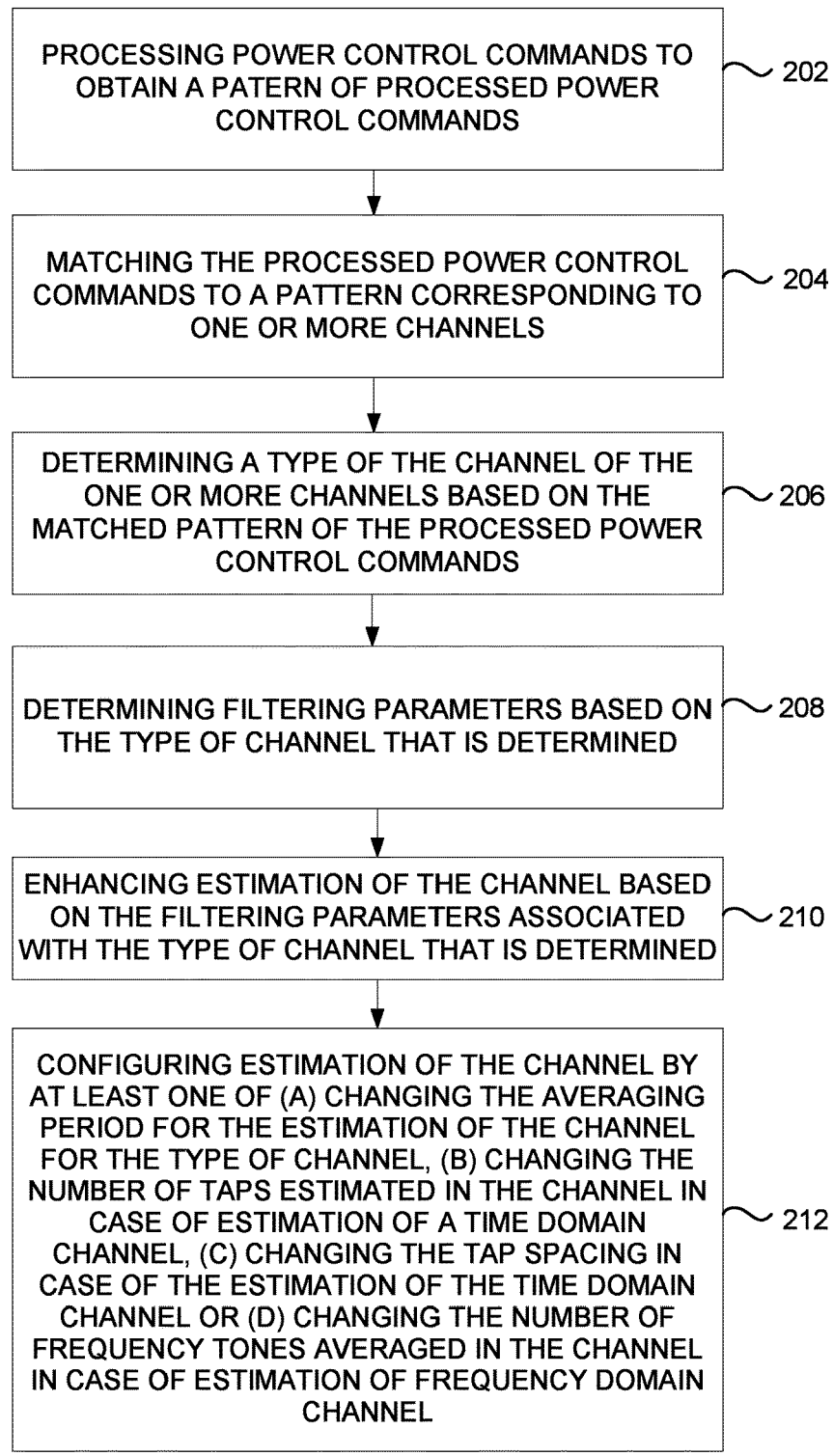
FIG. 2 is a flow diagram that illustrating a method of enhancing estimation of a channel of a received signal at a receiver by determining a type of channel using power control commands of FIG. 1A according to an embodiment herein.

FIG. 2 is a flow diagram that illustrating a method of enhancing estimation of a channel of a received signal at a receiver 100 by determining a type of channel using power control commands of FIG. 1A according to an embodiment herein. At step 202, the power control commands are processed to obtain a pattern of processed power control commands. In an embodiment, the power control commands include at least one of (a) power up, or (b) power down. At step 204, the pattern of the processed power control commands are matched to a pattern corresponding to one or more channels. At step 206, the type of channel of the one or more channels is determined based on the matched pattern of the processed power control commands (i.e. a processed power control commands matching output). At step 208, filtering parameters are determined based on the type of channel that is determined. At step 210, estimation of the channel is enhanced based on the filtering parameters associated with the type of channel that is determined. At step 212, the estimation of the channel is configured by at least one of (a) changing the averaging period for the estimation of the channel for the type of channel, (b) changing the number of taps estimated in a channel in case of the estimation of a time domain channel, (c) changing the tap spacing in case of the estimation of the time domain channel or (d) changing the number of frequency tones averaged in the channel in case of the estimation of a frequency domain channel. In an embodiment, the one or more channels are classified based on sequence of magnitudes of the power control commands that are used by a classifier.

Figure 3:
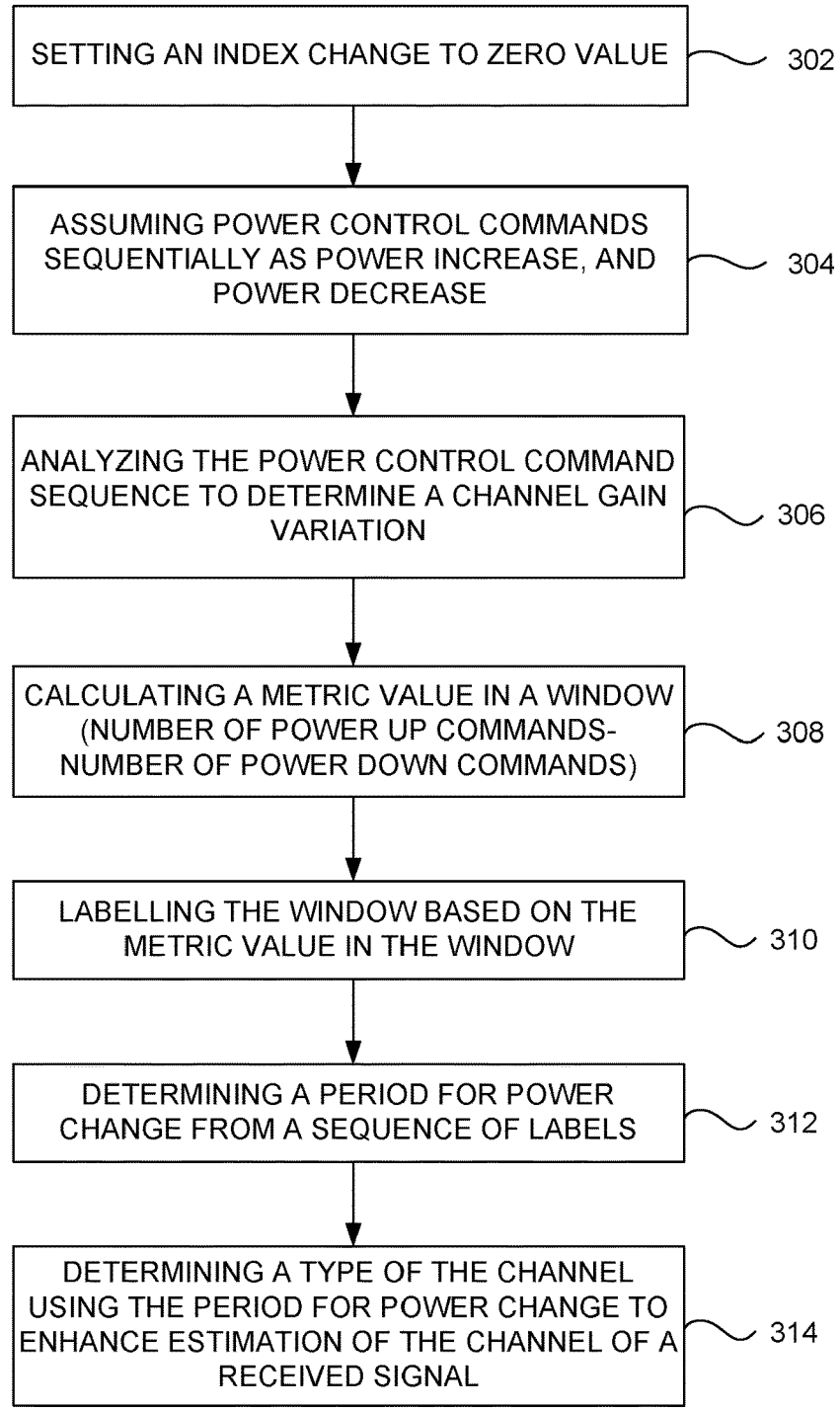
FIG. 3 is a flow diagram illustrating a method of determining a type of a channel using a power control commands processing block in a WCDMA receiver, according to an embodiment herein.

FIG. 3 is a flow diagram illustrating a method of determining a type of a channel using a power control commands processing block 102 in a WCDMA receiver, according to an embodiment herein. At step 302, an index change is set to zero value. At step 304, the power control commands are assumed sequentially. At step 306, the power control commands sequence is analyzed to determine a channel gain variation. In an embodiment, the "N" power control commands ($PC_{(k-1)N+1}$ to $PC_{kN}$) are obtained in the window "k". The "N", and the window "k" are positive integers indicating the window length and a window index respectively. At step 308, a metric value is calculated in a window (number of power up commands−number of power down commands). At step 310, the window is labeled based on the metric value in the window. For example, the window is labeled as 1 (power down) when the metric is less than a threshold. The window is labeled as 2 (power up) when the metric value is greater than another threshold. The window is labeled as 0 (power unchanged) neither the metric value that is less than said threshold nor the metric value that is greater than said another threshold is met. At step 312, a period for power change is determined from a sequence of labels. At step 314, the type of channel is determined using the period for power change to enhance the estimation of the channel of the received signal.

Figure 4:
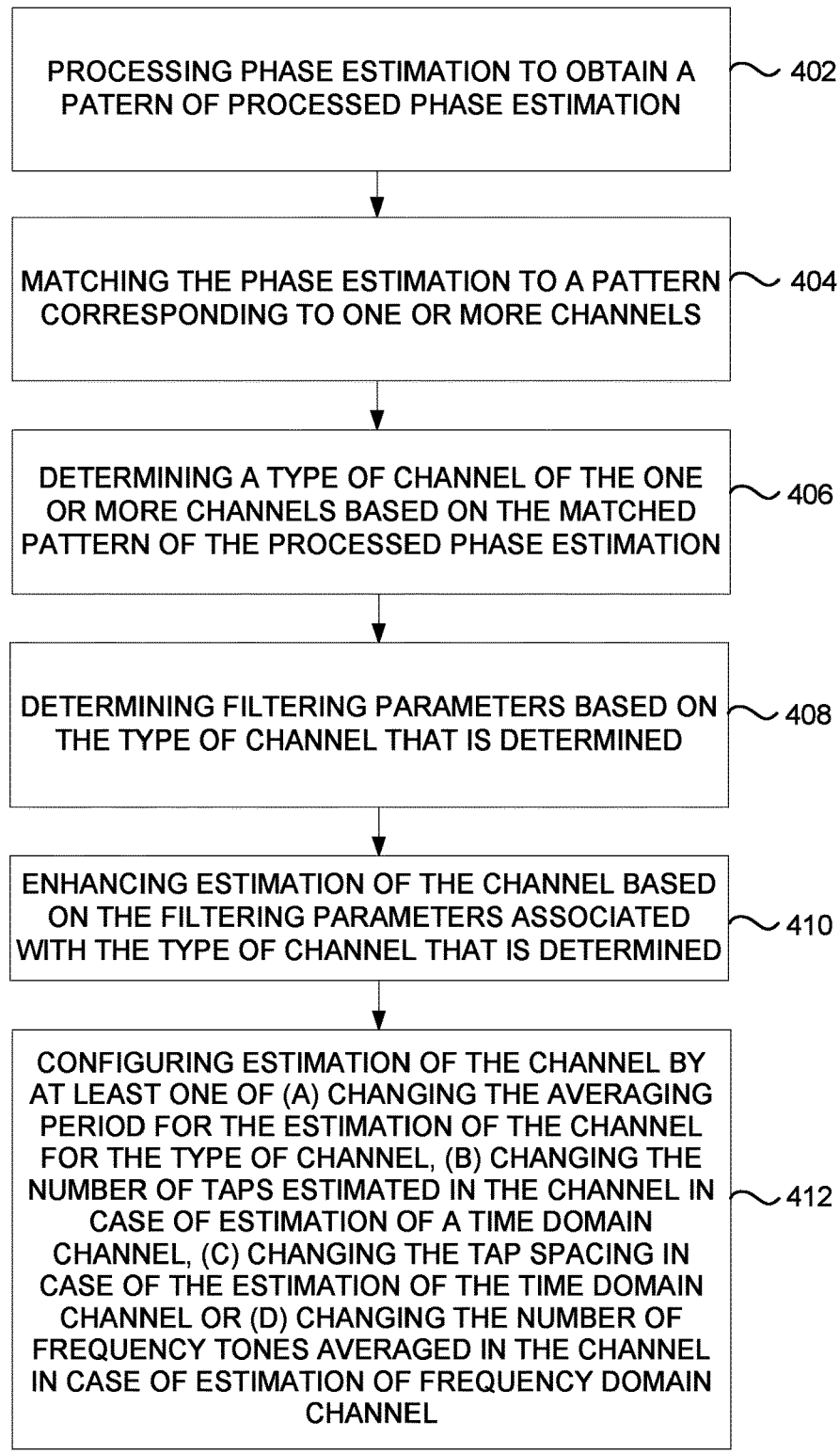
FIG. 4 is a flow diagram that illustrating a method of enhancing estimation of a channel of a received signal at a receiver by determining a type of channel using phase estimation of FIG. 1B according to an embodiment herein.

FIG. 4 is a flow diagram that illustrating a method of enhancing estimation of a channel of a received signal at a receiver 100 by determining a type of channel using phase estimation of FIG. 1B according to an embodiment herein. At step 402, the phase estimation is processed to obtain a pattern of processed phase estimation. At step 404, the pattern of the processed phase estimation is matched to a pattern corresponding to one or more channels. In an embodiment, the matching of the processed phase estimation to the pattern corresponding to the one or more channels include at least one of (a) computing an average rate of change of the phase estimation after the phase is unwrapped, or (b) finding the rate of change of the phase estimation with a maximum likelihood (ML) value after the phase is unwrapped. At step 406, the type of channel for the one or more channels is determined based on the matched pattern of the processed phase estimation (i.e. a processed phase estimation matching output). At step 408, filtering parameters are determined based on the type of channel that is determined. At step 410, estimation of the channel is enhanced based on the filtering parameters associated with the type of channel that is determined. At step 412, the estimation of the channel is configured by at least one of (a) changing the averaging period for the estimation of the channel for the type of channel of the one or more channels, (b) changing the number of taps estimated in a channel in case of the estimation of the time domain channel, (c) changing the tap spacing in case of the estimation of the time domain channel or (d) changing the number of frequency tones averaged in the channel in case of the estimation of a frequency domain channel.

Figure 5:
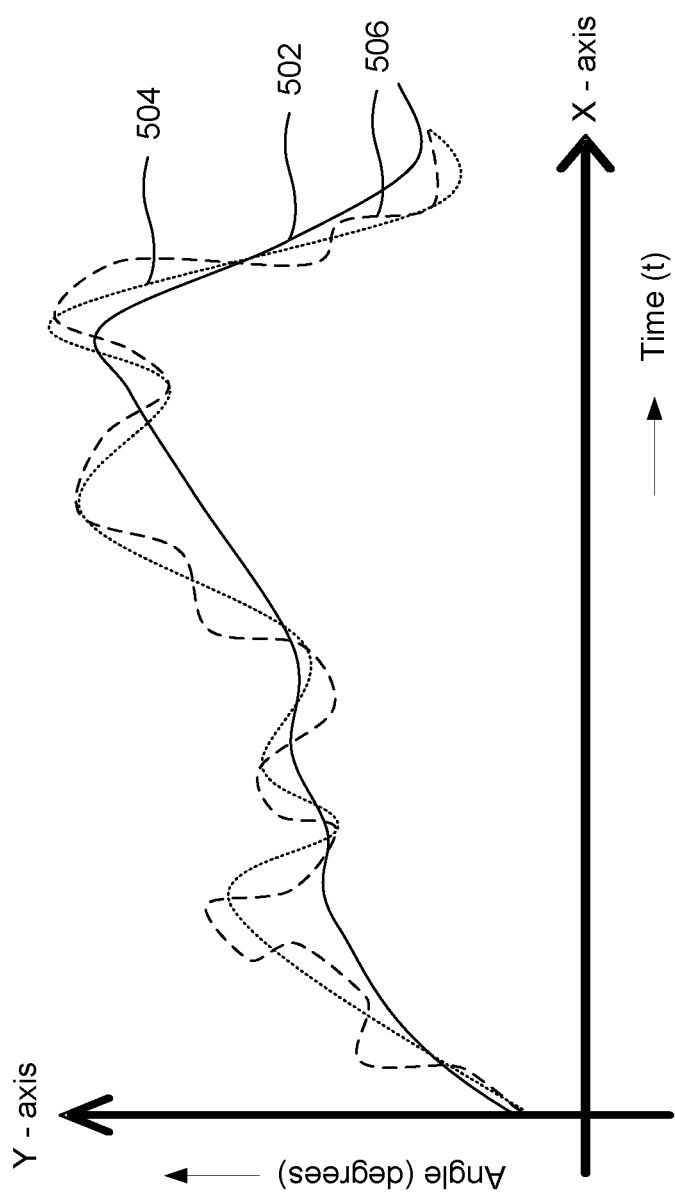
FIG. 5 is a graphical representation that illustrates estimation of channel of a received signal before filtering, after heavily filtering and ideal filtering at the receiver according to an embodiment herein.

FIG. 5 is a graphical representation that illustrates estimation of the channel of a received signal before filtering, after heavily filtering and ideal filtering at the receiver 100 according to an embodiment herein. The graphical representation 500 includes a time (t) plotted along X-axis and an angle (in degrees) plotted along Y-axis. In one embodiment, the power value may be plotted along Y-axis. The graphical representation 500 includes a first graph 502 representing heavily filtered estimate of the channel, a second graph 504 representing ideally filtered estimate of the channel, and a third graph 506 representing raw estimate of the channel before filtering a received signal. The second graph 504 represents an ideal filtering of the received signal following channel change and noise elimination. The first graph 502 representing heavy filtering is not desired.

Figure 6:
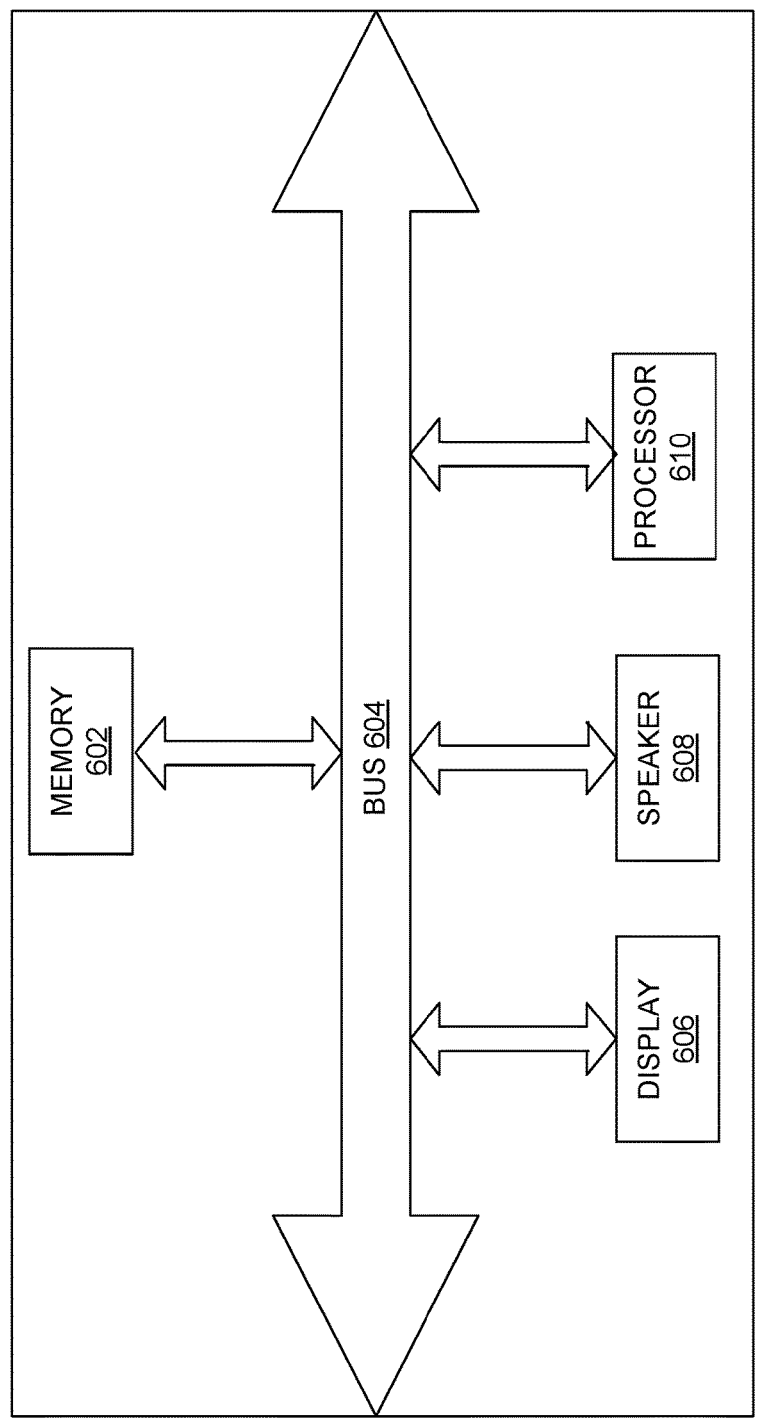
FIG. 6 illustrates an exploded view of a receiver according to an embodiment herein.

FIG. 6 illustrates an exploded view of a receiver having a memory 602 having a set of instructions, a bus 604, a display 606, a speaker 608, and a processor 610 capable of processing the set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 602 may also store program specific information and/or service information (PSI/SI), including information about digital content (e.g., the detected information bits) available in the future or stored from the past. A user of the receiver may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the receiver using the bus 604.

The techniques provided by embodiments herein enable controlling of filtering of a channel estimate to provide optimum performance. The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The system may reduce the noise at the receiver 100 by enhancing the estimation of the channel based on the channel type detection. The system may also adapt the speed at which the channel change is tracked by varying the averaging of the estimation of the channel.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A receiver for enhancing estimation of a channel of a received signal, wherein said receiver is being configured to
process at least one of (a) power control commands to obtain a pattern of processed power control commands or (b) phase estimation to obtain a pattern of processed phase estimation, wherein said power control commands comprise at least one of (a) power up, or (b) power down;
match said pattern of at least one of (a) processed power control commands, or (b) processed phase estimation to a pattern corresponding to a plurality of channels;
determine a type of channel of said plurality of channels based on said matched pattern of at least one of (a) said processed power control commands, or (b) said processed phase estimation;
determine filtering parameters based on said type of channel that is determined; and
enhance estimation of said channel based on said filtering parameters associated with said type of channel that is determined.

2. The receiver of claim 1, wherein said receiver configures said estimation of said channel by at least one of (a) changing an averaging period for said estimation of said channel for said type of channel, (b) changing a number of taps estimated in a channel in case of estimation of a time domain channel, (c) changing a tap spacing in case of said estimation of said time domain channel or (d) changing a number of frequency tones averaged in said channel in case of estimation of a frequency domain channel.

3. The receiver of claim 1, wherein when said receiver comprises a WCDMA receiver, said process of said power control commands comprises steps of:
setting an index change to zero value;
assuming said power control commands sequentially, wherein said power control commands are at least one of (a) power increase, or (b) power decrease;
analyzing said power control command sequence to determine a channel gain variation, wherein "N" power control commands ($PC_{(k-1)N+1}$ to $PC_{kN}$) are obtained in a window "k", wherein said "N", and said "k" are positive integers indicating corresponding window length and window index respectively;
calculating a metric value in said window as (number of power up commands−number of power down commands);
labeling said window as 1 (power down) when said metric value is less than a threshold, wherein said window is labeled as 2 (power up) when said metric value is greater than another threshold, wherein said window is labeled as 0 (unchanged) when neither said metric value that is less than said threshold nor said metric value that is greater than said another threshold is met;
determining a period for power change from a sequence of labels; and determining said type of channel using said period for power change to enhance said estimation of said channel of said received signal.

4. The receiver of claim 1, wherein when said receiver comprises a WCDMA receiver, said matching comprises at least one of (a) computing an average rate of change of said phase estimation after a phase is unwrapped or (b) finding said rate of change of said phase estimation with a maximum likelihood (ML) value after said phase is unwrapped.

5. The receiver of claim 1, wherein said plurality of channels are classified based on a magnitude of said power control commands used by a classifier.

6. A method of enhancing estimation of a channel of a received signal at a receiver, said method comprising:
processing at least one of (a) power control commands to obtain a pattern of processed power control commands or (b) phase estimation to obtain a pattern of processed phase estimation, wherein said power control commands comprise at least one of (a) power up, or (b) power down;
matching said pattern of at least one of (a) processed power control commands, or (b) processed phase estimation to a pattern corresponding to a plurality of channels;
determining a type of channel of said plurality of channels based on said matched pattern of at least one of (a) said processed power control commands, or (b) said processed phase estimation;
determining filtering parameters based on said type of channel that is determined; and
enhancing estimation of said channel based on said filtering parameters associated with said type of channel that is determined.

7. The method of claim 6, further comprising configuring said estimation of said channel by at least one of (a) changing an averaging period for said estimation of said channel for said type of channel, (b) changing a number of taps estimated in a channel in case of said estimation of a time domain channel, (c) changing a tap spacing in case of said estimation of said time domain channel or (d) changing a number of frequency tones averaged in said channel in case of said estimation of a frequency domain channel.

8. The method of claim 6, wherein when said receiver comprises a WCDMA receiver, said processing of said power control commands comprising steps of:
setting an index change to zero value;
assuming said power control commands sequentially, wherein said power control commands are at least one of (a) power increase, or (b) power decrease;
analyzing said power control command sequence to determine a channel gain variation, wherein "N" power control commands ($PC_{(k-1)N+1}$ to $PC_{kN}$) are obtained in a window "k", wherein said "N", and said "k" are positive integers indicating corresponding window length and window index respectively;
calculating a metric value in said window as (number of power up commands−number of power down commands);
labeling said window as 1 (power down) when said metric value is less than a threshold, wherein said window is labeled as 2 (power up) when said metric value is greater than another threshold, wherein said window is labeled as 0 (unchanged) when neither said metric value that is less than said threshold nor said metric value that is greater than said another threshold is met;
determining a period for power change from a sequence of labels; and determining said type of channel using said period for power change to enhance said estimation of said channel of said received signal.

9. The method of claim 6, wherein said processing of said power control commands comprises a weighted average of a power control command value, and wherein a weight for said weighted average comprises at least one of (a) a rectangular shape, (b) a triangular shape, (c) Gaussian function or (d) polynomial function.

10. The method of claim 8, wherein said period for power change is measured as an average number of contiguous windows when a power is at least one of (a) down or unchanged or (b) up or unchanged.

11. The method of claim 6, wherein said plurality of channels are classified based on sequence of magnitudes of said power control commands used by a classifier.

12. The method of claim 6, wherein said matching comprises at least one of (a) computing an average rate of change of said phase estimation after a phase is unwrapped, or (b) finding said rate of change of said phase estimation with a maximum likelihood (ML) value after said phase is unwrapped.

* * * * *